(12) United States Patent
Pushkolli et al.

(10) Patent No.: US 9,287,704 B2
(45) Date of Patent: Mar. 15, 2016

(54) DEVICE AND METHOD FOR DETECTING A POLARITY REVERSAL ON A LOW VOLTAGE SIDE OF A DC VOLTAGE TRANSFORMER IN A DUAL-VOLTAGE VEHICLE ELECTRICAL SYSTEM

(75) Inventors: Beqir Pushkolli, Ludwigsburg (DE); Thomas Knorpp, Freiberg A.N. (DE); Michael Ruffer, Ludwigsburg (DE); Alexander Scheidle, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 791 days.

(21) Appl. No.: 13/519,503

(22) PCT Filed: Nov. 12, 2010

(86) PCT No.: PCT/EP2010/067388
§ 371 (c)(1),
(2), (4) Date: Oct. 2, 2012

(87) PCT Pub. No.: WO2011/080001
PCT Pub. Date: Jul. 7, 2011

(65) Prior Publication Data
US 2013/0021019 A1    Jan. 24, 2013

(30) Foreign Application Priority Data
Dec. 28, 2009 (DE) .......................... 10 2009 055 331

(51) Int. Cl.
*G01R 19/14* (2006.01)
*H02J 1/08* (2006.01)
*H02J 7/00* (2006.01)
*B60L 3/00* (2006.01)
(Continued)

(52) U.S. Cl.
CPC . *H02J 1/08* (2013.01); *B60L 3/003* (2013.01); *B60L 11/1868* (2013.01); *H02J 7/0034* (2013.01); *H02J 2001/008* (2013.01); *Y02T 10/7005* (2013.01); *Y02T 10/7066* (2013.01)

(58) Field of Classification Search
USPC .............. 324/133, 120, 126, 127, 117 R, 444
See application file for complete search history.

(56) References Cited

U.S. PATENT DOCUMENTS 4,379,989 A    4/1983  Kurz et al.
5,745,351 A *  4/1998  Taurand ............ H02M 3/33584
                                                         363/131
(Continued)

FOREIGN PATENT DOCUMENTS

CN        1413373      4/2003
DE      199 61 622     6/2001
(Continued)

*Primary Examiner* — Tung X Nguyen
*Assistant Examiner* — Thang Le
(74) *Attorney, Agent, or Firm* — Kenyon & Kenyon LLP

(57) ABSTRACT

A device and a method for detecting a polarity reversal on a low voltage side of a DC voltage transformer in a dual-voltage vehicle electrical system, particularly in a motor vehicle. A current flow is enabled, in this instance, in a connecting line on the low voltage side of the DC voltage transformer by a controllable switching element, a current is detected in a connecting line on the low voltage side of the DC voltage transformer, with the aid of a current sensor system, the direction of the detected current is evaluated by an evaluation unit and a polarity reversal is detected if the direction of the detected current differs from an expected current direction.

6 Claims, 1 Drawing Sheet

(51) Int. Cl.
  *B60L 11/18* (2006.01)
  *H02J 1/00* (2006.01)

(56) References Cited

U.S. PATENT DOCUMENTS

| | | | |
|---|---|---|---|
| 5,747,891 A | 5/1998 | Williams | |
| 5,781,420 A * | 7/1998 | Xia | H02M 3/33576 363/16 |
| 6,121,768 A * | 9/2000 | Taurand | G01R 15/183 324/117 R |
| 6,384,489 B1 | 5/2002 | Bluemel et al. | |
| 6,496,395 B2 * | 12/2002 | Tokunaga et al. | 363/97 |
| 2003/0155814 A1 | 8/2003 | Gronbach | |
| 2005/0270001 A1 * | 12/2005 | Jitaru | 323/247 |
| 2008/0030293 A1 * | 2/2008 | Kawasaki et al. | 336/212 |
| 2008/0062730 A1 * | 3/2008 | Wirtzberger et al. | 363/50 |
| 2009/0015973 A1 * | 1/2009 | Trunk et al. | 361/42 |
| 2009/0279326 A1 * | 11/2009 | Hyuugaji | H02M 3/33592 363/21.06 |
| 2010/0124086 A1 * | 5/2010 | Chen | 363/127 |
| 2011/0006599 A1 * | 1/2011 | Chemin et al. | 307/10.1 |
| 2011/0037416 A1 * | 2/2011 | Nakamura | H02M 3/33507 315/307 |
| 2011/0074295 A1 * | 3/2011 | Tanaka | 315/82 |

FOREIGN PATENT DOCUMENTS

| | | |
|---|---|---|
| DE | 102 08 982 | 9/2002 |
| DE | 103 13 752 | 10/2004 |
| DE | 198 46 319 | 2/2008 |
| DE | 10 2007 052750 | 5/2009 |
| WO | WO 02/087068 | 10/2002 |

* cited by examiner

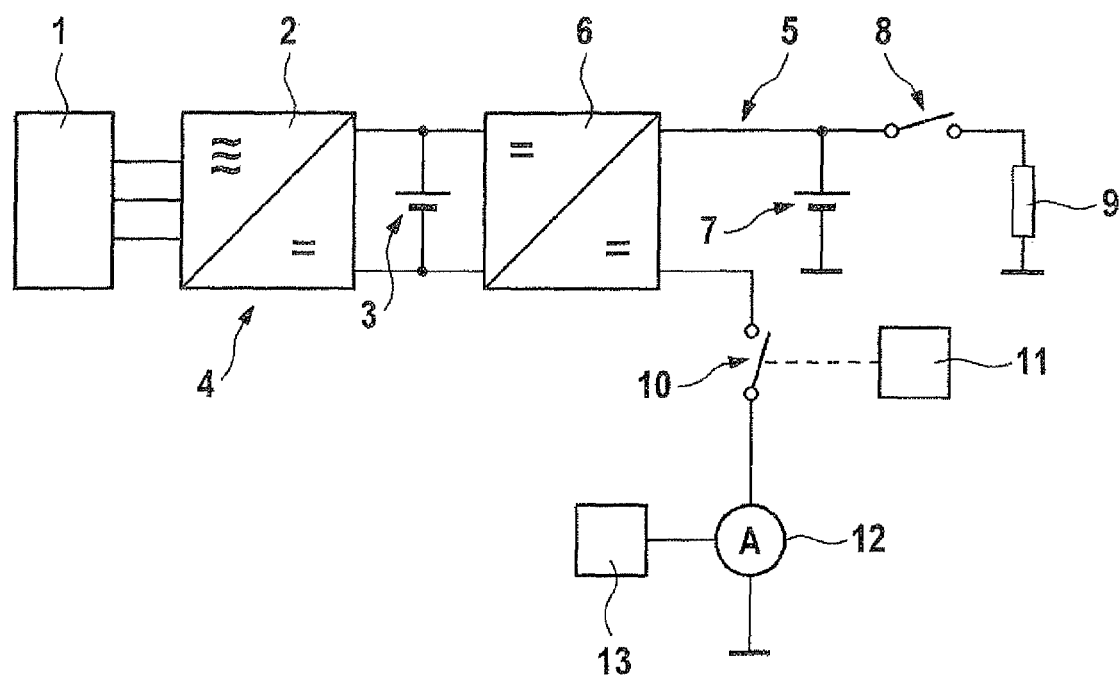

DEVICE AND METHOD FOR DETECTING A POLARITY REVERSAL ON A LOW VOLTAGE SIDE OF A DC VOLTAGE TRANSFORMER IN A DUAL-VOLTAGE VEHICLE ELECTRICAL SYSTEM

FIELD OF THE INVENTION

The present invention relates to a device and a method for detecting a polarity reversal on a low-voltage side of a DC voltage transformer in a dual-voltage vehicle electrical system, particularly in a motor vehicle.

BACKGROUND INFORMATION

Dual-voltage vehicle electrical systems are known, for instance, from motor vehicle technology, especially for hybrid or electric vehicles. Because of the increasing number of electrical users, a single voltage supply is often no longer sufficient. Furthermore, electrical users are being applied which require a higher operating voltage, so that dual-voltage vehicle electrical systems have been developed which have different voltage levels. It is customary, in this context, to connect these vehicle electrical systems via a direct voltage converter, frequently also designated as a DC voltage transformer, so as to supply these two vehicle electrical systems by a common generator.

Within the scope of an external start, or even because of a phase inversion caused in a different manner, a polarity reversal may take place on the low-voltage side of the DC voltage transformer. To be sure, DC voltage transformers may be designed to be protected against polarity reversal, up to a certain current level and limited as to time, but to avoid long-term damage to the DC voltage transformer, it is necessary reliably to detect a polarity reversal on the low-voltage side of the DC voltage transformer, and to convert the dual-voltage vehicle electrical system to a reliable operating state, if necessary.

A control unit protection for a dual-voltage vehicle electrical system is discussed, for example, in German document DE 199 61 622 A1, including two vehicle electrical systems of different voltage levels galvanically connected to each other, in which electrical users are situated, in which a protective diode is connected in the non-conducting direction in parallel to the electrical users in the vehicle electrical system having the lower voltage.

SUMMARY OF THE INVENTION

The exemplary embodiments and/or exemplary methods of the present invention are for providing a device for detecting a polarity reversal on a low-voltage side of a DC voltage transformer in a vehicle electrical system, especially in a motor vehicle, having a controllable switching element for enabling or interrupting a current flow in a connecting line on the low-voltage side of the DC voltage transformer, a current sensor system for detecting a current in a connecting line on the low-voltage side of the DC voltage transformer and an evaluating unit for evaluating the direction of the detected current and for detecting a polarity reversal if the direction of the detected current deviates from the expected direction of the current.

The exemplary embodiments and/or exemplary methods of the present invention are also for providing a method for detecting a polarity reversal on a low-voltage side of a DC voltage transformer in a dual-voltage vehicle electrical system, particularly in a motor vehicle, in which a current flow in a connecting line on the low-voltage side of the DC voltage transformer is enabled by a controllable switching element, a current in a connecting line is detected on the low-voltage side of the DC voltage transformer, the direction of the detected current is evaluated and a polarity reversal is detected if the direction of the detected current deviates from an expected direction of the current.

A DC voltage transformer in a dual-voltage vehicle electrical system is used for transferring electrical energy from a high-voltage side to a low-voltage side, or vice versa. In this context, a so-called buck operation or a so-called boost operation of the DC voltage transformer is involved. As a function of the type of operation of the DC voltage transformer, a current flow in a specified direction is expected in the connecting lines of the DC voltage transformer on the low-voltage side. If the current flow in a connecting line of the DC-voltage transformer is detected on the low-voltage side with the aid of a current sensor system, a polarity reversal is certainly able to be detected by the evaluation of the direction of the detected current and a subsequent comparison of the direction of the current to the expected direction of the current. Since the current on the low-voltage side of the DC voltage transformer is ascertained in any case for certain purposes, such as a current control or a vehicle electrical system energy calculation, i.e. has to be measured directly or calculated, no additional expenditure in terms of circuit technology is required, compared to usual systems.

According to one specific embodiment of the present invention, the direction of the current is ascertained based on the sign of the current detected, and a polarity reversal is detected when the sign of the detected current deviates from an expected sign.

According to a further specific embodiment, the switching element is closed upon activation of the DC voltage transformer. In this way, a polarity reversal is able to be detected directly after switching on the DC voltage transformer with the aid of the direction of the current on the low-voltage side of the DC voltage transformer. By the direct initiation of suitable measures, which transfer the vehicle electrical system to a secure state, it is able to be prevented that the DC voltage transformer, and/or additional components connected to the vehicle electrical system, are damaged as a result of the polarity reversal.

One further specific embodiment of the present invention provides for closing the switching element in a standby mode of the DC voltage transformer by a control unit at regular time intervals. In this way, without activating the DC voltage transformer at regular time intervals, on the low-voltage side of the DC voltage transformer a current flow is caused, whose direction represents a clear indicator for a possible polarity reversal. In this instance, the current flow on the low-voltage side of the DC voltage transformer is based on the charge-reversal processes of already charged capacitors in the low-volt vehicle electrical system. In this way, even before activating the DC voltage transformer, a polarity reversal that has taken place during the standby operation may be reliably detected and the vehicle electrical system may be transferred to a more secure operating state.

Additional features and advantages of specific embodiments of the present invention come about from the following description, with reference to the attached FIGURE.

BRIEF DESCRIPTION OF THE DRAWING

The FIGURE shows a schematic representation of a dual-voltage vehicle electrical system having a device according to the present invention for the detection of polarity reversal.

DETAILED DESCRIPTION

An electric machine 1 used as a generator is connected via an inverted rectifier 2 to a high voltage battery 3 that is used as a charge storage. Generator 1, inverted rectifier 2 and energy store 3 jointly form an high voltage partial vehicle electrical system 4. The high voltage partial vehicle electrical system 4 may include additional components, not shown, such as users or loads, which may also be designed to be able to be switched on or off. The charge storage, as shown, may be a battery or even a capacitor, or a so-called Super-Cab.

The connection between the high voltage partial vehicle electrical system 4 and a low voltage partial vehicle electrical system 5 is produced via DC voltage transformer 6. On the low voltage side of DC voltage transformer 6 a charge storage in the form of a low voltage battery 7 is provided, as well as, for instance, a user 9 that is able to be switched on or off via a load-switching element 8.

According to the exemplary embodiments and/or exemplary methods of the present invention, in one of the connecting lines of the DC voltage transformer a controllable switching element 10 is provided, which is controllable via a control unit 11. Controllable switching element 10 may be designed as a relay or a transistor, for example. Besides that, in one of the connecting lines of the DC voltage transformer on the low voltage side, a current sensor system 12 is provided, which detects a current flow in the connecting line. In the exemplary embodiment shown, both controllable switching element 10 and current sensor system 12 are provided in the connecting line, which is connected to negative connecting terminal $B^N$ of DC voltage transformer 6. Alternatively to this, controllable switching element 10 and/or current sensor system 12 could also be provided in the connecting line, however, which is connected to connecting terminal $B^N$- of DC voltage transformer 6.

A current flow is detected in the connecting line of DC voltage transformer 6 on the lower voltage side, with the aid of current sensor system 12. According to the exemplary embodiments and/or exemplary methods of the present invention, the output signals of current sensor system 12 are transmitted to an evaluation unit 13, which compares the direction of the detected current to an expected current direction, and detects a polarity reversal on the low voltage side of DC voltage transformer 6 if the direction of the detected current deviates from the expected current direction. The expected current direction, in this instance, is a function of the type of operation of DC voltage converter 6, that is, a function of whether DC voltage converter 6 is being operated in buck operation or in boost operation.

According to specific embodiments of the present invention, control unit 11 controls switching element 10 in such a way that it is closed at regular intervals upon the activation of DC voltage transformer 6 and/or in a standby mode of DC voltage transformer 6. The closing of switching element 10 in each case effects a current flow on the low voltage side of DC voltage transformer 6, which is able to be evaluated to detect a polarity reversal. The current flow on the low voltage side of DC voltage transformer 6, after the closing of switching element 10, is effected, in the case of the activation of DC voltage transformer 6, by the charging of internal capacitors in the low voltage vehicle electrical system, and, in the case of a standby operation, by a charge-reversal of capacitors that are already charged in the low voltage vehicle electrical system.

What is claimed is:

1. A device for detecting a polarity reversal on a low voltage side of a DC voltage transformer in a dual-voltage vehicle electrical system, comprising:
    a controllable switching element for selectively enabling and interrupting a current flow in a connecting line on the low voltage side of the DC voltage transformer;
    a current sensor system for detecting the current in the connecting line on the low voltage side of the DC voltage transformer; and
    an evaluation unit for evaluating the direction of the detected current and for detecting a polarity reversal if the direction of the detected current deviates from an expected current direction;
    wherein, in a standby mode of the DC voltage transformer, the switching element is closed by the control unit at regular time intervals.

2. The device of claim 1, wherein, after the closing of the switching element, the evaluation unit compares a sign of the detected current to an expected sign and detects a polarity reversal if the signs deviate from each other.

3. The device of claim 1, wherein, upon activation of the DC voltage transformer, the switching element is closed by a control unit.

4. A method for detecting a polarity reversal on a low voltage side of a DC voltage transformer in a dual-voltage vehicle electrical system, the method comprising:
    enabling a current flow in a connecting line on the low voltage side of the DC voltage transformer by a controllable switching element;
    detecting the current in the connecting line on the low voltage side of the DC voltage transformer;
    evaluating the direction of the detected current; and
    detecting a polarity reversal if the direction of the detected current deviates from an expected current direction;
    wherein, in a standby mode of the DC voltage transformer, the switching element is closed at regular time intervals.

5. The method of claim 4, wherein a sign of the detected current is compared to an expected sign, and a polarity reversal is detected if the signs deviate from each other.

6. The method of claim 4, wherein, upon activation of the DC voltage transformer, the switching element is closed.

* * * * *